US009553970B2

(12) United States Patent
Pothul et al.

(10) Patent No.: US 9,553,970 B2
(45) Date of Patent: Jan. 24, 2017

(54) CELL PHONE SYSTEM FOR ENABLING AND DISABLING A VEHICLE

(75) Inventors: Ronald J. Pothul, Great Barrington, MA (US); Joseph N. Pothul, Great Barrington, MA (US)

(73) Assignee: DOCK-N-LOCK LLC, Great Barrington, MA (US)

( * ) Notice: Subject to any disclaimer, the term of this patent is extended or adjusted under 35 U.S.C. 154(b) by 1219 days.

(21) Appl. No.: 12/586,590

(22) Filed: Sep. 24, 2009

(65) Prior Publication Data

US 2011/0070930 A1 Mar. 24, 2011

(51) Int. Cl.
*H04M 1/00* (2006.01)
*H04M 1/667* (2006.01)

(52) U.S. Cl.
CPC .................................. *H04M 1/667* (2013.01)

(58) Field of Classification Search
USPC ...................................................... 455/575.9
See application file for complete search history.

(56) References Cited

U.S. PATENT DOCUMENTS

| 7,277,007 | B2 * | 10/2007 | John et al. ................... 340/5.61 |
| 7,285,872 | B2 | 10/2007 | Ellingsworth et al. |
| 7,363,129 | B1 | 4/2008 | Barnicle et al. |
| 2005/0255874 | A1 | 11/2005 | Stewart-Baxter et al. |
| 2006/0130033 | A1 * | 6/2006 | Stoffels et al. ............... 717/166 |
| 2007/0270122 | A1 | 11/2007 | Ewell, Jr. |
| 2008/0268767 | A1 * | 10/2008 | Brown et al. ..................... 455/1 |
| 2010/0214083 | A1 * | 8/2010 | McNay ..................... 340/426.1 |

* cited by examiner

*Primary Examiner* — Hsin-Chun Liao
(74) *Attorney, Agent, or Firm* — Heslin Rothenberg Farley & Mesiti P.C.; Kristian E. Ziegler

(57) ABSTRACT

A cell phone system (10) for enabling and disabling a vehicle (12) includes a cell phone (20) and a receiving receptacle (22) secured within the vehicle (12) that is configured so that the cell phone (20) cannot transmit signals whenever the cell phone (20) is secured within the receiving receptacle (22). A vehicle enabling mechanism (44) is secured within the receiving receptacle (22) and is also secured in communication with an engine (50) of the vehicle (12) so that placement of the cell phone (20) within the receiving receptacle (22) activates the vehicle enabling mechanism (44) to put the vehicle (12) in an enabled mode, and so that removal of the cell phone (20) from the receiving receptacle (22) deactivates the vehicle enabling mechanism (44) to put the vehicle (12) in a disabled mode.

25 Claims, 4 Drawing Sheets

CELL PHONE SYSTEM FOR ENABLING AND DISABLING A VEHICLE

TECHNICAL FIELD

This disclosure relates to a system for enabling and disabling a vehicle such as an automobile, and particularly relates to use of a specific cell phone to enable and disable a specific vehicle.

BACKGROUND ART

Cell phones are increasingly common especially amongst adolescents and teenagers, and use of cell phones by young and novice operators of vehicles has become a grave hazard on roadways. Initially, it was thought that use of an operator's hand or hands during operation of the cell phone was the primary problem resulting in inattentive drivers. Therefore, many efforts focused upon development of "hands-free" cell phones, either integral with the vehicle, or by way of dashboard mounting of cell phones with removable headsets, or "BLUETOOTH" brand ear pieces, etc. However, more recent studies have concluded that the most distracting aspect of cell phone usage is a conversational interchange between the user and the person to whom the user is talking. Unlike a radio or musical sound system within a vehicle, which is exclusively one-way communication, cell phone usage is necessarily two-way communication that involves such a high level of mental activity that simultaneous careful operation of a vehicle frequently becomes a secondary concern.

More recently, cell phones have grown in technical complexity, involving "smart phones" that can access the internet for e-mail correspondence, and that include full mini-keyboards for "texting" messages, etc. Consequently, cell-phone based driver distractions have become an ever growing hazard. To minimize this potentially lethal hazard, many states have enacted laws severely restricting usage of cell phones while driving. Unfortunately, however, such laws are extremely difficult to enforce, especially at night when driving hazards are greatest because law enforcement officers are unable to see within vehicles.

This problem has been recognized and many efforts have been undertaken to eliminate usage of a cell phone by an operator of a vehicle. Such efforts however, typically require very costly and complex apparatus and systems and therefore have not experienced widespread acceptance. For example, a "Motion Disabled Cell Phone" is shown in U.S. Patent Application Publication No. US 2005/0255874 A1 by Stewart-Baxter et al. The Stewart-Baxter cell phone includes use of a "Global Positioning System" ("GPS") reader or an accelerometer integrated within a cell phone, and software within the cell phone to disable the cell phone when motion of the phone is detected by the GPS reader or accelerometer. Such a cell phone therefore, cannot be utilized in a moving vehicle. Another example is shown in U.S. Patent Application Publication No. US 2008/0268767 A1 to Brown et al., wherein an interference device and an antenna element secured within a vehicle produce a bare carrier wave or noise at sufficient power to interfere with operation of a cell phone within the vehicle. Both Stewart-Baxter et al. and Brown et al. require costly modifications to a cell phone and a vehicle, and both result in all cell phones within a vehicle being disabled.

Another example of an effort to restrict usage of cell phones in a vehicle is shown in U.S. Patent Application Publication No. US 2007/0270122 A1 to Ewell Jr. The Ewell Jr. disclosure also requires use of a location tracking unit that uses a GPS signal and a disabling circuit within a cell phone. The resulting system may be utilized to disable cell phones when they are within a restricted region, provided the cell phones include the disabling circuit. These disclosures indicate that complex and costly systems are available for selectively disabling cell phones to suit particular conditions. However, none have gained wide acceptance probably because they require substantial modification to cell phones, which result in the inability of the modified cell phone to be utilized whether the owner of the cell phone is operating the vehicle, or merely a passenger in the vehicle. Therefore such unpopular modified cell phones are simply not available.

SUMMARY OF THE DISCLOSURE

Purchasers of cell phones for adolescent, high-risk vehicle operators are typically parents or guardians of those adolescents. It is most common that such purchasers acquire a "family plan" from a cell phone carrier, and provide cell phones to their children for purposes of security and efficiency of communication. An extremely important need for such "family plan" purchasers is to prevent a specific adolescent or novice high-risk vehicle operator plan member (e.g., a teenage son or daughter) from using a specific cell phone while operating a specific vehicle. For example, the parent purchasers of the plan may have a family vehicle for use by all members of the family, and a higher quality car for use by the parents only. Or, the high-risk operator may have a vehicle of their own. Additionally, the parents may be responsible for a sixteen-year-old child that is newly licensed and is only to operate the family vehicle. Therefore, these common types of cell phone purchasers and operators have a common and particular problem; namely, to prevent a specific newly licensed driver from using a specific cell phone while operating a specific vehicle. Identification of this particular problem is considered an inventive aspect of this disclosure.

The present disclosure resolves this problem with a cell phone system for enabling and disabling a vehicle. The vehicle, such as an automobile, is for transporting at least a vehicle operator, and the vehicle has an enabled mode for permitting motion of the vehicle and a disabled mode for preventing motion of the vehicle. The cell phone system includes a cell phone for transmitting and receiving communication signals, wherein the cell phone has a fully operational mode for permitting transmission and reception of communication signals and an idle mode for preventing transmission of communication signals. The system also includes a receiving receptacle secured within the vehicle and configured for receiving and securing the cell phone within the receiving receptacle so that the cell phone is in the idle mode whenever the cell phone is secured within the receiving receptacle. A vehicle enabling mechanism is secured within the receiving receptacle and is also secured in communication with an engine of the vehicle. The vehicle enabling mechanism is configured so that placement of the cell phone within the receiving receptacle activates the vehicle enabling mechanism to put the vehicle in the enabled mode, and so that removal of the cell phone from the receiving receptacle deactivates the vehicle enabling mechanism to put the vehicle in the disabled mode.

In use of the present cell phone system for enabling and disabling a vehicle, the cell phone acts as a second ignition key for operation of the vehicle. Upon purchasing cell phones, the purchaser would select a specific cell phone for the cell-phone restricted driver that would be configured to activate the vehicle enabling mechanism. That specific cell phone could be adapted to communicate with the vehicle enabling mechanism by way of internal circuitry, or by way of a retro-fit adhesive information strip bearing detectable information, such as a bar-code strip, an adhesive magnetic tape with digital information, etc. That specific cell phone would be disabled from usage while in the receiving receptacle by being physically remote from the operator.

The receiving receptacle would also be in communication with an engine control unit ("ECU") in much the same way as a remote car starter system and ignition key. The cell phone system may be distributed as either an after-market product sold with the cell phones to the family purchaser, or as an integral system wired into the vehicle during manufacture of the vehicle. The receiving receptacle may also include a receiving receptacle lock mechanism that is in communication with an ECU of the vehicle so that the receiving receptacle locks the cell phone within the receptacle whenever the vehicle is moving. Such a motion based lock is common in modern vehicles to lock doors of the vehicle for security during travel. The same system logic and control can readily be applied to the receiving receptacle to prevent removal of the cell phone from the receptacle during motion of the vehicle.

The present cell phone system would also include a receiving receptacle by-pass mechanism, such as a credit card sized card held by the non cell-phone restricted drivers, and inserted into the receiving receptacle to activate the vehicle enabling mechanism within the receptacle. The receiving receptacle by-pass mechanism would enable the parents and/or older, non cell-phone restricted drivers to operate the family vehicle containing the receiving receptacle without restrictions on usage of their cell phones.

Unlike known approaches to restricting cell phone usage by a vehicle operator that disrupt operation of a cell phone, instead the present cell phone system for enabling and disabling a vehicle interrupts operation of a specific vehicle by one or more specific cell phones. This system will therefore resolve the most pressing need of parents or guardians of high risk drivers by only disabling use of one or more specific cell phones of one or more high-risk drivers while driving a vehicle over which the parents or guardians seek to assert control. The present system also permits ordinary cell phone usage by non-vehicle operators within the vehicle, thereby providing increased security, efficiency and convenience. The cell phone system of the present disclosure achieves these goals with very modest cost and complexity and can be readily retro-fitted into common vehicles and with little or no internal modification of the restricted cell phone or phones.

PREFERRED EMBODIMENTS OF THE DISCLOSURE

Figure 1:
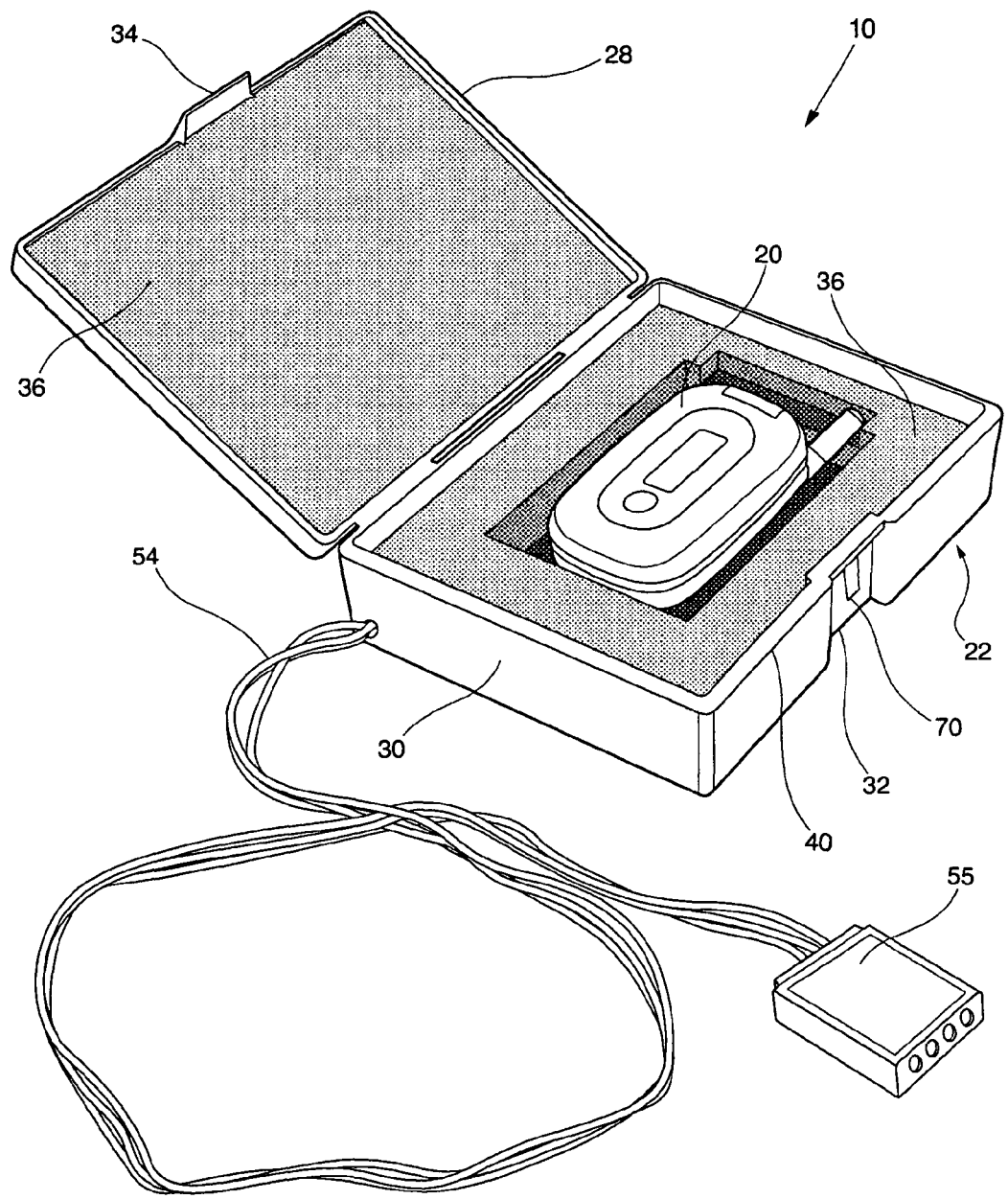
FIG. 1 is a raised perspective view of a cell phone system for enabling and disabling a vehicle constructed in accordance with the present disclosure.
Figure 2:
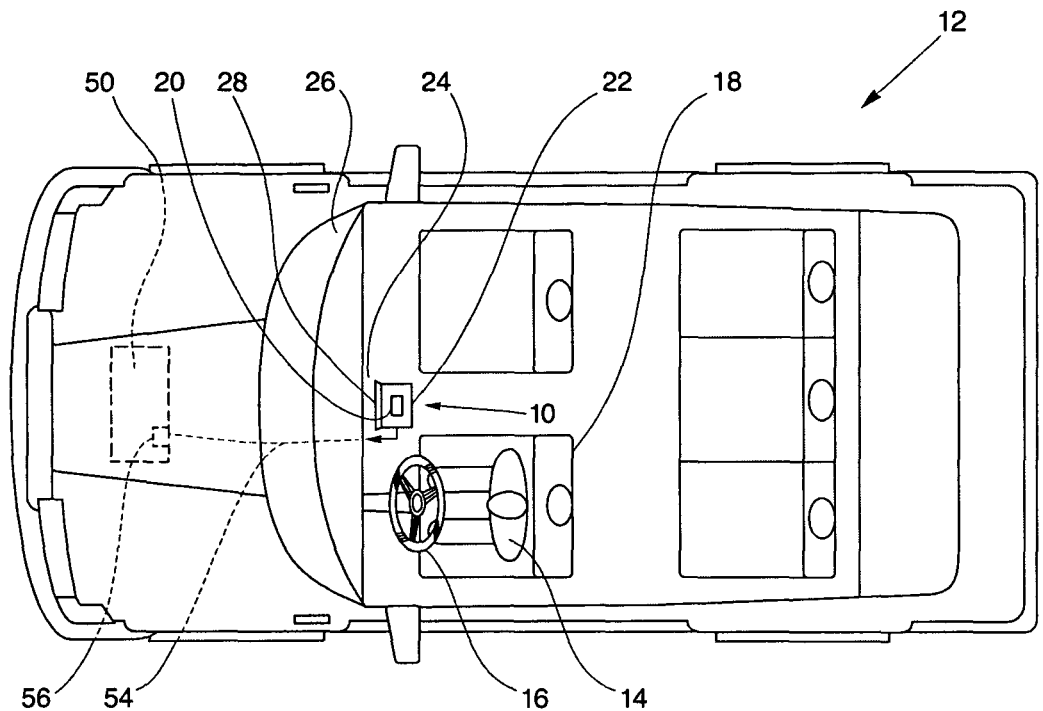
FIG. 2 is a top fragmentary plan view of a vehicle including a schematic representation of the present cell phone system for enabling and disabling a vehicle.

Referring to the drawings in detail, a cell phone system for enabling and disabling a vehicle is shown in FIG. 1 and is generally designated by the reference numeral 10. The cell phone system 10 is typically deployed within a vehicle 12 as shown in FIG. 2, wherein the vehicle 12 such as an automobile 12 is configured for transporting at least a vehicle operator 14 adjacent a steering wheel 16 within an operator's seat 18 of the vehicle 12. The vehicle 12 has an enabled mode for permitting motion of the vehicle 12 and a disabled mode for preventing motion of the vehicle 12.

The cell phone system 10 includes a cell phone 20 for transmitting and receiving communication signals, wherein the cell phone 20 has a fully operational mode for permitting transmission and reception of communication signals. The cell phone 20 also has an idle mode for at least preventing transmission of communication signals. For purposes herein, the phrase "idle mode", is to mean that the cell phone 20 is incapable of transmission of communication signals. Such an "idle mode" of the cell phone 20 may be the result of the phone 20 being physically remote from a user of the phone 20, or by any other method or apparatus such as internal circuitry, etc.

Figure 5:
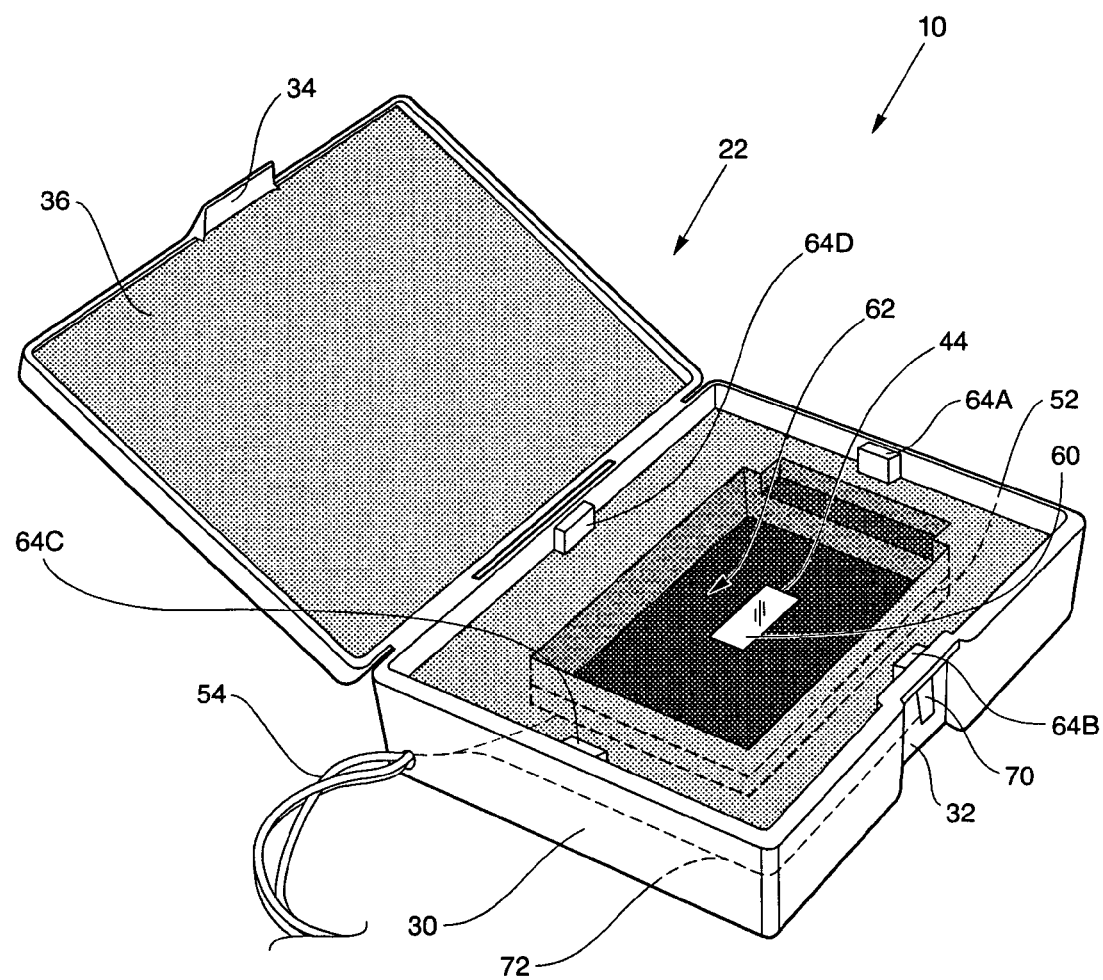
FIG. 5 is raised perspective view of a receiving receptacle of the present disclosure showing the receptacle open, and showing a schematic representation of a vehicle enabling mechanism secured within the receptacle.
Figure 6:
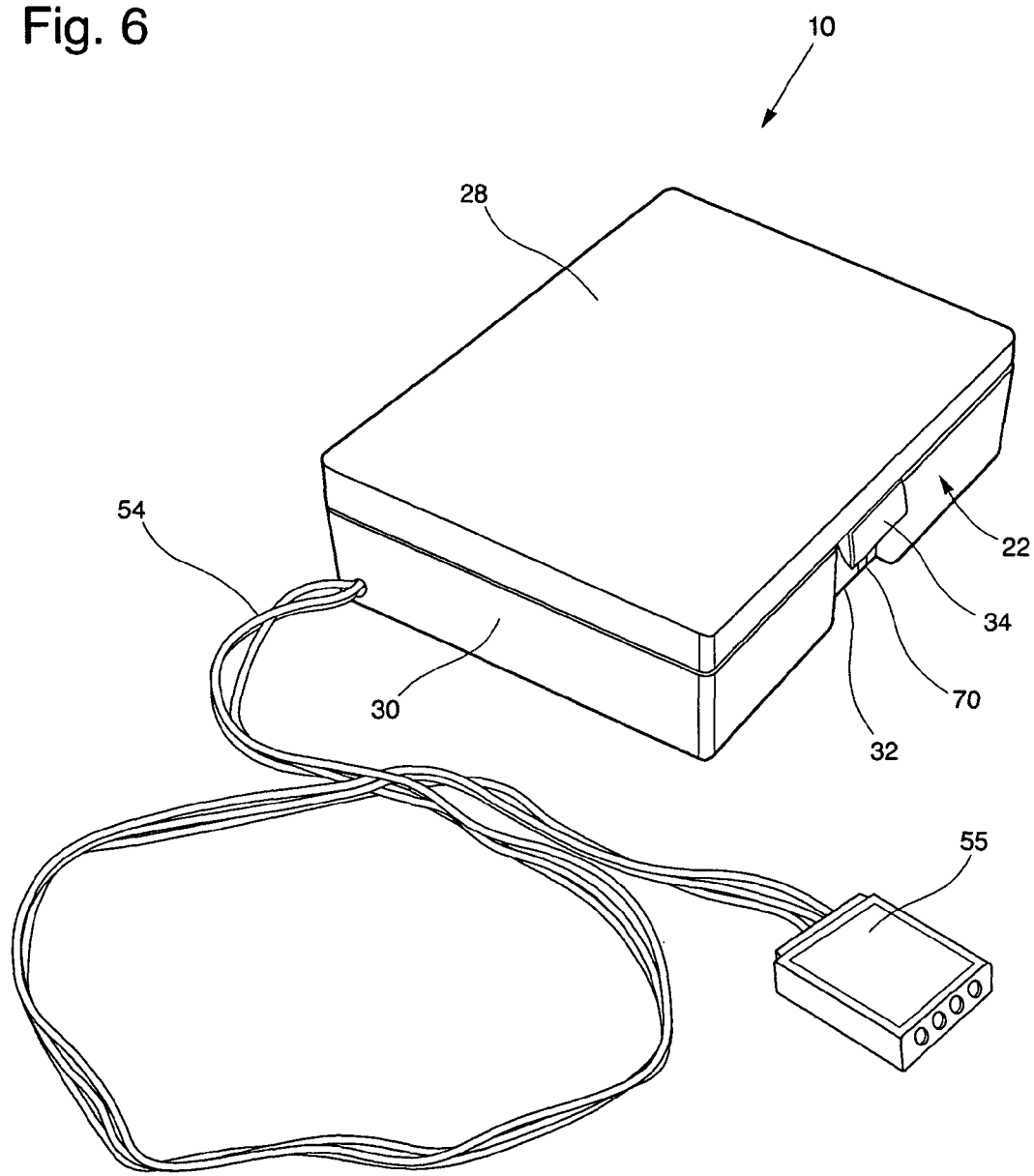
FIG. 6 is a raised perspective view of a receiving receptacle of the present disclosure showing the receptacle closed to secure a cell phone within the receptacle.

The cell phone system 10 also includes a receiving receptacle 22 secured within the vehicle 12, such as on a center console 24 of the vehicle 12 (as shown in FIG. 2), or on or within a dashboard 26 of the vehicle 12. The receiving receptacle 22 includes a top 28 pivotally secured to a base 30, and it also includes a latch-lock 32 defined within the base 30 and dimensioned to receive and lock a lock-tab 34 protruding from the top 28 of the receptacle receiver 22. As best shown in FIGS. 1 and 5, the receptacle receiver 22 also includes non-rigid resilient contact material 36 secured to interior surfaces of the top 28 and the base 30 for cushioning the cell phone 20 and for securing the phone 20 in a fixed position whenever the top 28 is secured to the base 30. The resilient contact material 36 may be any sponge like or plastic foam substance suitable for minimizing shock damage to the cell phone 20 while simultaneously securing the cell phone 20 against movement within the closed receptacle. While the cell phone 20 is so secured within the receiving receptacle 22, the cell phone 20 is in its idle mode so it cannot transmit communication signals primarily because the cell phone 20 is remote from the vehicle operator 14.

Figure 3:
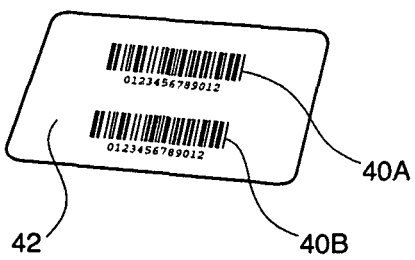
FIG. 3 is a schematic representation of two removable information strips on a card wherein the strips include information and wherein the strips may be removed from the card and secured to one or more cell phones.

FIG. 3 shows a schematic representation of two removable information strips 40A and 40B supported on a card 42. The information strips 40A, 40B include information, such as a bar code, or electronically readable information on a magnetic medium, or any other known technology that provides for communication of information from a strip to an information reading apparatus, such as a vehicle enabling mechanism 44 (shown in FIG. 5). The information strips 40A, 40B are dimensioned to be secured to an exterior surface of the cell phone 20. The information strips 40A, 40B are configured to be selectively removed from the card 42 and secured to one or more cell phones 20, such as by an adhesive material, as is commonly done with known adhesive mailing labels or envelopes, etc.

Figure 4:
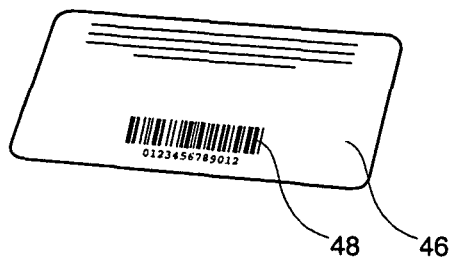
FIG. 4 is a schematic representation of a by-pass card bearing information for placement within a receiving receptacle of the present disclosure to activate a vehicle enabling mechanism of the present disclosure.

FIG. 4 shows a simplified schematic representation of a by-pass card 46 to which is affixed a by-pass information strip 48. The by-pass information strip 48 will include the same information as the information strips 40A, 40B, however, the by-pass information strip 48 would be permanently secured to the by-pass card 46. In use of the cell phone system 10, a purchaser of the system 10 would remove the information strips 40A, 40B and secure them respectively to the cell phone 20 and possibly other cell phones (not shown) belonging to high-risk drivers for whom the purchaser bears some responsibility. The purchaser would then simply place the by-pass card 46 in her or his wallet as they would with a credit card, and then use the by-pass card 46 as a second ignition key. The cell phone system 10 may be available with a plurality of identical by-pass cards 46.

The vehicle enabling mechanism 44 of the cell phone system 10 for enabling and disabling the vehicle 12 also includes communication means secured to the vehicle enabling mechanism 44 for communicating enabling and disabling signals to an engine 50 of the vehicle 12. The communication means may include any known technology for communicating signals capable of enabling and/or disabling the vehicle engine 50, such as a controller 52 (shown in FIG. 5) and a signal wire 54 and wire connector 55 secured in electrical communication with the controller 52 and with the engine 50. Alternative communication means may include wireless signal transmissions, electro-mechanical signal transmitters, or any other communicating means known in the art to be capable of the described functions.

The vehicle enabling mechanism 44 is configured or manufactured so that positioning of the cell phone 20 within the receiver receptacle 22 activates the vehicle enabling mechanism 44 to put the vehicle 12 in the enabled mode, and so that removal of the cell phone 20 from the receiver receptacle 22 deactivates the vehicle enabling mechanism 44 to put the vehicle 12 in the disabled mode. The vehicle enabling mechanism 44 including its controller 52 is configured and manufactured for communicating with the engine 50 of the vehicle through known methods and apparatus, as described for example in U.S. Pat. No. 7,363,129 to Barnicle et al. which describes both wired and wireless communication with Engine Control Units ("ECUs"), and which Patent is hereby incorporated herein by reference. The controller generates signals in a manner comparable to known "remote-control car starters" that permit start up of a vehicle 12 from a remote distance by compression of a spring-biased button in a hand-held switch (not shown). The controller 52 of the vehicle enabling mechanism 44 when activated similarly generates an engine-operation signal and communicates it to an ECU 56 of the engine 50 of the vehicle 12. When the vehicle enabling mechanism 44 is deactivated, either the engine-operation signal is interrupted, or an engine disabling signal is generated and communicated to the ECU 56 to disable the vehicle 12. The engine disabling signal may be the same form of control signal as generated in known vehicles by turning off and removing an ignition key.

As shown in FIG. 5, an embodiment of the vehicle enabling mechanism 44 includes a reader head 60 secured so that it may read the information on the information strips 40A, 40B or on the by-pass information strip 48 secured to the by-pass card 46. The reader head may be secured on an exterior surface of the controller 52 and positioned within a reader void 62 defined within the resilient material 36 within the base of the receiver receptacle 22. Alternatively, the reader head 60 may simply be flush-mounted with the resilient material 36. A user would place the cell phone 20 within the base 30 of the open receptacle 22 so that the information strip 40A can be read by the reader head 60. Recognizing that cell phones are available in diverse sizes, the cell phone system 10 may include removable dimension bumpers 64A, 64B, 64C, 64D adjacent the resilient material 36 and exterior walls of the base 30 of the receptacle 22. The dimension bumpers 64A, 64B, 64C, 64D may be included as part of the system 10 with a series of varying size bumpers (not shown) dimensioned to conveniently secure varying sized cell phones within the base 30 adjacent the reader head 60. The dimension bumpers 64A, 64B, 64C, 64D may include adhesive surfaces to selectively secure them to the resilient material 36 for snuggly securing a specific cell phone 20 in a fixed location within the receiving receptacle 22.

In use of this embodiment of the cell phone system 10, it is important that the reader head 60 consistently reads the information on the information strip 40A secured to the cell phone 20. This may be achieved through a variety of methods. For example, the information strip 40A may first be placed upon the reader head 60 so that the information surface of the information strip 40A is adjacent the reader head 60 and an opposed adhesive surface of the information strip 40A faces in a direction away from the reader head 60 with the adhesive exposed. The cell phone 20 may then be placed within the receiving receptacle 22 so that it is snuggly positioned adjacent one or more of the adjustable removable dimensioned bumpers 64A, 64B, 64C, 64D. Then the cell phone 20 is compressed against the resilient material 36 so that the information strip 40A adheres to the cell phone 20 in a fixed position that permits reading of the information on the information strip 40A by the reader head 60 whenever the cell phone 20 is placed within the receiving receptacle 22.

Alternatively, the reader head 60 of the vehicle enabling mechanism 44 maybe in the nature of a known bar code scanner 60 that can scan an entire surface of the cell phone 20 to find and read information from the information strip 40A secured to the cell phone 20. In such an embodiment, the resilient material 36 may be an optically transparent material so that the bar code scanner 60 can communicate through the material 36. In a further embodiment, the resilient material 36 may be a see-through mesh material permitting communication by the bar code scanner 60 or other form information reader through the see-through mesh resilient material 36.

The cell phone system 10 for enabling and disabling a vehicle 12 may also include an auto lock 70 secured within the latch-lock 32. The auto lock 70 is secured in communication with the engine 50, such as with the engine ECU 56, through an auto lock line 72 between the auto lock 70 and the signal wire 54, or through any communication means capable of performing the communication functions described herein. The auto lock 70 operates in the same manner as known automobile door locks (not shown) that lock automatically in response to operation of the engine 50 of the vehicle 12. It is known that for security purposes shortly after the vehicle 12 engine 50 starts up (such as about 30 seconds thereafter) the ECU 56 communicates to all door locks (not shown) to lock. This minimizes the risk of car jacking or other unauthorized intrusion into the vehicle, or unauthorized exiting of the vehicle by children in the rear seats, etc. The auto lock 70 similarly receives a command from the ECU 56 shortly after the engine 50 starts up to lock the receiving receptacle 22, thereby prohibiting access to the cell phone 20 secured within the receptacle 22 while it is locked.

Although the receiving receptacle 22 is shown in the described embodiments as a stand-alone, box-like structure, it is to be understood that the receiving receptacle 22 may be in any form that permits the described functions. For example, the receiving receptacle 22 may be integral with the vehicle 12, such as within or under the dashboard 26 in the form of a receiving sleeve or port 22 with no cover 28 so that the cell phone 20 is simply inserted into the integral receiving receptacle 22. The receiving receptacle 22 may be any structure that can house the vehicle enabling mechanism 44 in such a manner that the mechanism 44 can interact with the cell phone 20 to enable the vehicle 12. While communication between the vehicle enabling mechanism 44 and the engine 50 of the vehicle 12 has been described as communication through an ECU 56, it is to be understood that the vehicle enabling mechanism 44 may communicate with the engine 50 of the vehicle 12 so that the engine 50 is enabled to operate permitting motion of the vehicle 12. Such communication may be by way of the ECU 56, or any other known vehicle control apparatus that may put the vehicle 12 in an enabled mode.

While application of the information strip 40A to the cell phone 20 is disclosed as one embodiment of the cell phone system 10 and method for enabling and disabling a vehicle 12, the present disclosure also includes any apparatus or method that applies enabling information to the cell phone 20 so that particular cell phone 20 will selectively enable and disable the particular vehicle 12 having the receiving receptacle 22. Such apparatus and/or methods of applying enabling information to the cell phone 20 also includes modifying circuitry of the cell phone 20; modifying transmission capacity of the cell phone 20 so that the cell phone 20 communicates directly with the vehicle enabling mechanism 44; integrating the vehicle enabling mechanism 44 within the cell phone 20 so that the cell phone 20 and integral vehicle enabling mechanism 44 only communicate with the engine 50 of the vehicle 12 when the cell phone 20 is physically secured within the receiving receptacle 22; or, any known apparatus and/or method that cooperate to result in putting the vehicle 12 in an enabled mode whenever the cell phone 20 is secured within the receiving receptacle 22 so that the cell phone 20 cannot transmit communication signals.

The present disclosure also includes a method of enabling and disabling the vehicle 12 through the steps of securing enabling information to the cell phone 20; constructing the receiving receptacle 22 so that placement of the cell phone 20 within the receiving receptacle 22 prohibits transmission of communication signals from the cell phone 20; securing the vehicle enabling mechanism 44 within the receiving receptacle 22; securing the receiving receptacle 22 within the vehicle 12; inserting the cell phone 20 within the receiving receptacle 22 to activate the vehicle enabling mechanism 44 to thereby put the vehicle 12 in an enabled mode for permitting motion of the vehicle 12; and, removing the cell phone 20 from the receiving receptacle 22 to deactivate the vehicle enabling mechanism 44 to thereby put the vehicle 12 in a disabled mode for preventing motion of the vehicle 12.

While the present disclosure has been presented above with respect to the described and illustrated embodiments of a cell phone system 10 for enabling and disabling a vehicle 12, it is to be understood that the disclosure is not to be limited to those alternatives and described embodiments. Accordingly, reference should be made primarily to the following claims rather than the forgoing description to determine the scope of the disclosure.

What is claimed is:

1. A system for enabling and disabling a vehicle with a cell phone capable of transmitting and receiving communication signals, the vehicle being for transporting at least a vehicle operator, the vehicle having an enabled mode for permitting starting or motion of the vehicle and a disabled mode for preventing starting or motion of the vehicle, the system comprising:
   a receiving receptacle secured within the vehicle and configured for receiving the cell phone therewithin and such that transmission of communication signals from the cell phone are prevented whenever the cell phone is received within the receiving receptacle; and
   a vehicle enabling mechanism operably coupled to the receiving receptacle and including a signal wire for communication with an engine of the vehicle, the vehicle enabling mechanism being configured such that placement of the cell phone within the receiving receptacle activates the enabled mode of the vehicle, and such that removal of the cell phone from within the receiving receptacle activates the disabled mode of the vehicle,
   wherein the receiving receptacle is a stand-alone retro-fit structure configured to secure to the vehicle.

2. The system of claim 1, wherein the receiving receptacle further includes an auto lock mechanism secured in communication with an engine of the vehicle, and wherein the auto lock mechanism automatically locks the receiving receptacle in response to operation of the engine of the vehicle in the enabled mode such that at least the vehicle operator is prevented from accessing the cell phone within the receiving receptacle.

3. The system of claim 1, wherein the vehicle enabling mechanism is adapted to receive communications from the cell phone when the cell phone is within the receiving receptacle to activate the enabled mode of the vehicle.

4. The system of claim 1, wherein the cell phone includes enabling information, and wherein the vehicle enabling mechanism is adapted to receive at least a communication corresponding to the enabling information from the cell phone.

5. The system of claim 1, further including a by-pass card having a by-pass information strip configured such that placement of the by-pass card into the receiving receptacle activates the enabled mode of the vehicle, and such that removal of the by-pass card from the receiving receptacle activates the disabled mode of the vehicle.

6. The system of claim 1, wherein the cell phone is received within the receiving receptacle when the receiving receptacle substantially encloses the cell phone.

7. The system of claim 1, wherein the receiving receptacle includes a base and a top, wherein at least one of the top and the base is moveable with respect to the other of the top and the base, and wherein the receiving receptacle substantially encloses the cell phone when the top is positioned substantially on the base.

8. The system of claim 1, wherein the transmission of communication signals from the cell phone are prevented whenever the cell phone is within the receiving receptacle due to the cell phone being remote from the vehicle operator.

9. The system of claim 8, wherein the transmission of communication signals from the cell phone are additionally prevented whenever the cell phone is within the receiving receptacle due to means other than the cell phone being remote from the vehicle operator.

10. The system of claim 1, wherein the vehicle enabling mechanism includes a controller for communication with the engine of the vehicle, and wherein the vehicle enabling mechanism and the controller are configured to be secured in electrical communication by the signal wire.

11. The system of claim 10, wherein the vehicle enabling mechanism includes a connector coupled to the signal wire of the vehicle enabling mechanism, and wherein the connector is configured to electrically couple the signal wire and the controller.

12. A method of providing a system for enabling and disabling a vehicle with a cell phone capable of transmitting and receiving communication signals, the vehicle being for transporting at least a vehicle operator, the vehicle having an enabled mode for permitting starting or motion of the vehicle and a disabled mode for preventing starting or motion of the vehicle, the method comprising:
 providing a receiving receptacle configured for installation within the vehicle; and
 providing a vehicle enabling mechanism configured to operably couple to the receiving receptacle and including a signal wire to communicate with an engine of the vehicle,
 wherein the receiving receptacle is a stand-alone retro-fit structure configured to secure to the vehicle and such that placement of the cell phone within the receiving receptacle prohibits transmission of communication signals from the cell phone, and wherein the receiving receptacle and vehicle enabling mechanism are configured such that, after installation in the vehicle, placement of the cell phone within the receiving receptacle sets the vehicle in the enabled mode and removal of the cell phone from within the receiving receptacle sets the vehicle in the disabled mode.

13. The method of claim 12, further comprising automatically locking the receiving receptacle in response to operation of an engine of the vehicle in the enabled mode to thereby prohibit removal of the cell phone from the receiving receptacle while the vehicle is in the enabled mode.

14. The method of claim 12, wherein the vehicle enabling mechanism is adapted to receive communications from the cell phone when the cell phone is within the receiving receptacle to activate the enabled mode of the vehicle.

15. The method of claim 12, wherein the receiving receptacle and vehicle enabling mechanism are configured such that, after installation in the vehicle, placement of a by-pass card within the receiving receptacle sets the vehicle in the enabled mode and removal of the by-pass card from within the receiving receptacle sets the vehicle in the disabled mode.

16. The method of claim 12, wherein the receiving receptacle includes a top and a base, wherein at least one of the top and the base is moveable with respect to the other of the top and the base, and wherein the receiving receptacle is configured, after installation, to automatically lock the top on the base in response to operation of the engine of the vehicle in the enabled mode to thereby prohibit removal of the cell phone from within the receiving receptacle.

17. The method of claim 12, wherein the transmission of communication signals from the cell phone are prevented whenever the cell phone is within the receiving receptacle due to the cell phone being remote from the vehicle operator.

18. The method of claim 17, wherein the transmission of communication signals from the cell phone are additionally prevented whenever the cell phone is within the receiving receptacle due to means other than the cell phone being remote from the vehicle operator.

19. A method of prohibiting operation of a cell phone by a vehicle operator while the vehicle is in an enabled mode permitting starting or motion of the vehicle, the method comprising:
 providing a stand-alone retro-fit receiving receptacle configured to secure to the vehicle and such that placement of the cell phone within the receiving receptacle prohibits transmission of communication signals from the cell phone;
 coupling a vehicle enabling mechanism to the receiving receptacle; and
 electrically coupling the vehicle enabling mechanism to the vehicle via at least one signal wire such that the vehicle enabling mechanism is in communication with an engine of the vehicle,
 wherein the receiving receptacle and vehicle enabling mechanism are configured such that, after installing to the vehicle, placement of the cell phone within the receiving receptacle sets the vehicle in the enabled mode and removal of the cell phone from within the receiving receptacle sets the vehicle in a disabled mode preventing starting or motion of the vehicle.

20. The method of claim 19, further comprising automatically locking the receiving receptacle in response to operation of an engine of the vehicle in the enabled mode to thereby prohibit removal of the cell phone from the receiving receptacle while the vehicle is in the enabled mode.

21. The method of claim 19, wherein the vehicle enabling mechanism is adapted to receive communications from the cell phone when the cell phone is within the receiving receptacle to activate the enabled mode of the vehicle.

22. The method of claim 19, wherein the receiving receptacle includes a top and a base, wherein at least one of the top and the base is moveable with respect to the other of the top and the base, and wherein the receiving receptacle is configured, after installation, to automatically lock the top substantially over the base in response to operation of the engine of the vehicle in the enabled mode to thereby prohibit removal of the cell phone from within the receiving receptacle.

23. The method of claim 19, wherein the transmission of communication signals from the cell phone are prevented whenever the cell phone is within the receiving receptacle due to the cell phone being remote from the vehicle operator.

24. The method of claim 23, wherein the transmission of communication signals from the cell phone are additionally prevented whenever the cell phone is within the receiving receptacle due to means other than the cell phone being remote from the vehicle operator.

25. The method of claim 19, further including at least one of:
 enabling the disabled mode and thereby preventing the vehicle operator from starting the vehicle with an ignition key when the cell phone is not positioned within the receiving receptacle or not in communication with the vehicle enabling mechanism; and
 enabling the enabled mode and thereby allowing the vehicle operator to start the vehicle with an ignition key when the cell phone is positioned within the receiving receptacle and in communication with the vehicle enabling mechanism.

* * * * *